United States Patent

Huyben et al.

[15] 3,656,010

[45] Apr. 11, 1972

[54] TRANSISTORIZED MASTER SLAVE FLIP-FLOP CIRCUIT

[72] Inventors: Bernardus Johannes Maria Huyben, Hertogenbosch; Evert Jan van Barneveld; Louwrens Marinus Van de Steen, both of Nijmegen, all of Netherlands

[73] Assignee: U.S. Philips Corporation, New York, N.Y.

[22] Filed: Dec. 9, 1969

[21] Appl. No.: 883,419

[30] Foreign Application Priority Data

Dec. 10, 1968 Netherlands..........................6817658
Oct. 3, 1969 Netherlands..........................6914950

[52] U.S. Cl. ..............................307/279, 307/225, 307/251, 307/304, 328/29, 340/173

[51] Int. Cl. ........................................H03k 5/00, H03k 3/26

[58] Field of Search..................307/279, 289, 304, 251, 225, 307/220; 328/39; 340/173

[56] References Cited

UNITED STATES PATENTS

| | | | |
|---|---|---|---|
| 2,906,894 | 9/1959 | Harris | 307/225 |
| 3,284,782 | 11/1966 | Burns | 307/304 X |
| 3,383,569 | 5/1968 | Luscher | 307/220 X |
| 3,384,766 | 5/1968 | Kardash | 307/279 X |
| 3,459,974 | 8/1969 | May | 307/289 X |
| 3,493,785 | 2/1970 | Rapp | 307/304 X |

*Primary Examiner*—Stanley T. Krawczewicz
*Attorney*—Frank R. Trifari

[57] ABSTRACT

A master slave flip-flop having lower dissipation and for a reduced number of cross-overs by the use of inverse logic, with a correct choice of the length width ratios of the channels of the field-effect transistors in order to prevent untimely changes of state are prevented.

7 Claims, 5 Drawing Figures

Patented April 11, 1972 3,656,010

4 Sheets-Sheet 1

Figure 1:
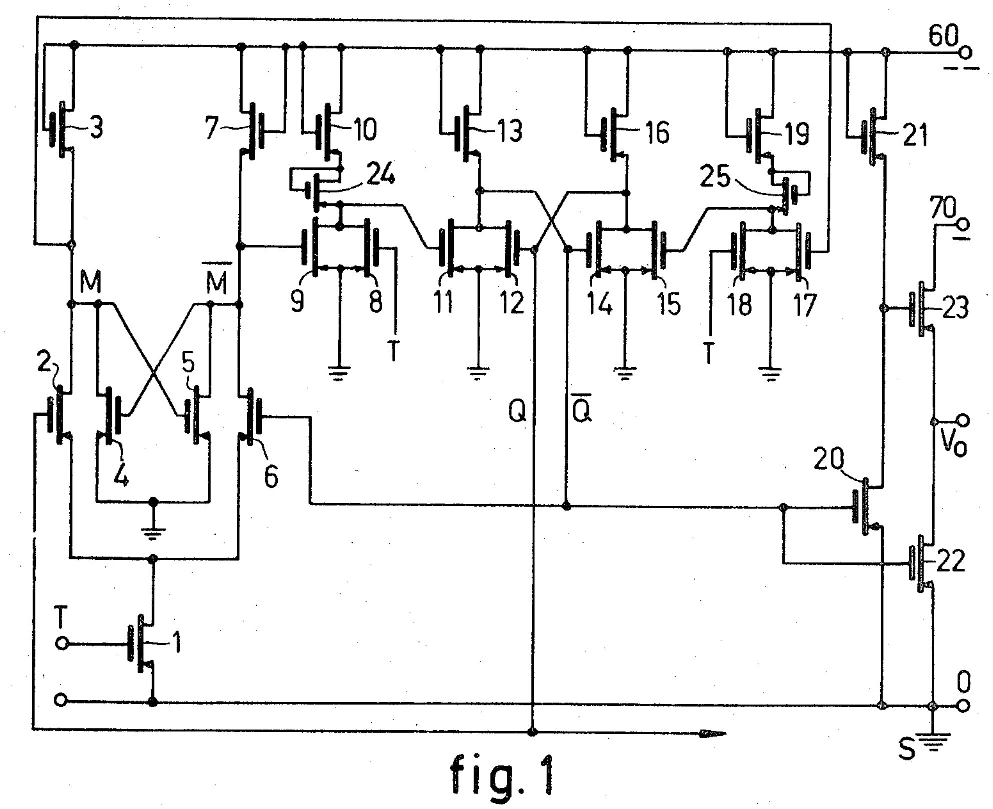

INVENTORS
BERNARDUS JOHANNES MARIA HUYBEN
EVERT JAN VAN BARNEVELD
LOUWRES MARINUS VAN DE STEEN
BY Frank R. Trifari
AGENT

*INVENTORS*
BERNARDUS J.M. HUYBEN
EVERT J. VAN BARNEVELD
*BY* LOUWRENS M. VAN DE STEEN

AGENT

*INVENTORS*
BERNARDUS J.M. HUYBEN
EVERT J. VAN BARNEVELD
*BY* LOUWRENS M. VAN DE STEEN
AGENT

INVENTORS
BERNARDUS JOHANNES MARIA HUYBEN
BY EVERT JAN VAN BARNEVELD
LOUWRENS MARINUS VAN DE STEEN
Frank R. Trifari
AGENT

TRANSISTORIZED MASTER SLAVE FLIP-FLOP CIRCUIT

The invention relates to a transistorized master slave flip-flop circuit including a first gate circuit, which is controlled by clock signals and by the output of the slave flip-flop and is connected to the master flip-flop, and a second gate circuit, which is controlled by the clock signals and by the output of the master flip-flop and is connected to the slave flip-flop. Such flip-flops are used, for example, for various computing purposes, for example in JK or DV flip-flops and in frequency dividers. In view of the large number of active elements required they usually are in the form of integrated circuits, for the manufacture of which techniques have been developed by means of which extremely complicated circuits can reliably be made.

One of the problems which arise in realizing such flip-flops in practice is the number of crossing connections between the various active and passive elements; in the manufacture of integrated circuits, such crossing connections may lead to additional manufacturing steps which considerably increases cost and the likelihood of rejects. Another problem is the dissipation produced when a large number of active elements (transistors) are disposed on a small-size semiconductor body. In order to obviate such problems, the invention is characterized in that the gate circuit connected to the one flip-flop comprises two partial gate circuits which each include the series connection of the main current paths of a transistor controlled by the clock signal and a transistor controlled by the output signal of the other flip-flop, while the gate circuit connected to this other flip-flop comprises two partial gate circuits, which each include the parallel connection of the main current paths of a transistor controlled by the clock signal and a transistor controlled by the output signal of the one flip-flop. By this circuit configuration the master and slave flip-flops are operated with "inverse" logic, as will be explained more fully hereinafter.

The flip-flop according to the invention is particularly suited to be constituted by isolated-gate field-effect transistors. A further problem which arises when MOS transistors or other isolated-gate field-effect transistors are used, is that at the instant of a change of state of a flip-flop its voltage, which through the gate circuit is applied to the other flip-flop, also changes, which may result in an instable state or incorrect switching. In practice, this is avoided in that the flip-flops are given different response times by means of inserted capacitors or stray capacitances, so that the untimely transfer of the change of state from one flip-flop through the gate circuit to the other flip-flop is avoided. This method has the disadvantage that it is not suitable for all the frequencies of the clock signals. As will appear from the following discussion, the circuit configuration according to the invention obviates this problem also by a suitable choice of the length-width ratios of the channels of the field-effect transistors included in the gate circuits with respect to their load resistances.

Figure 2:
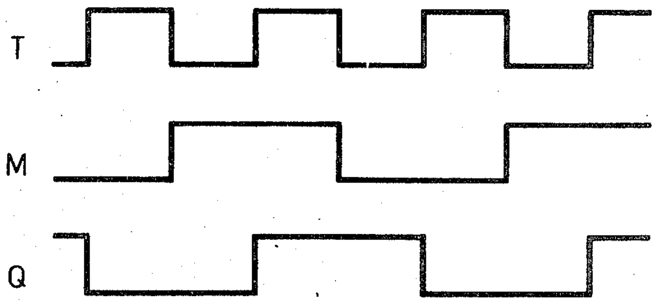
Figure 3A:
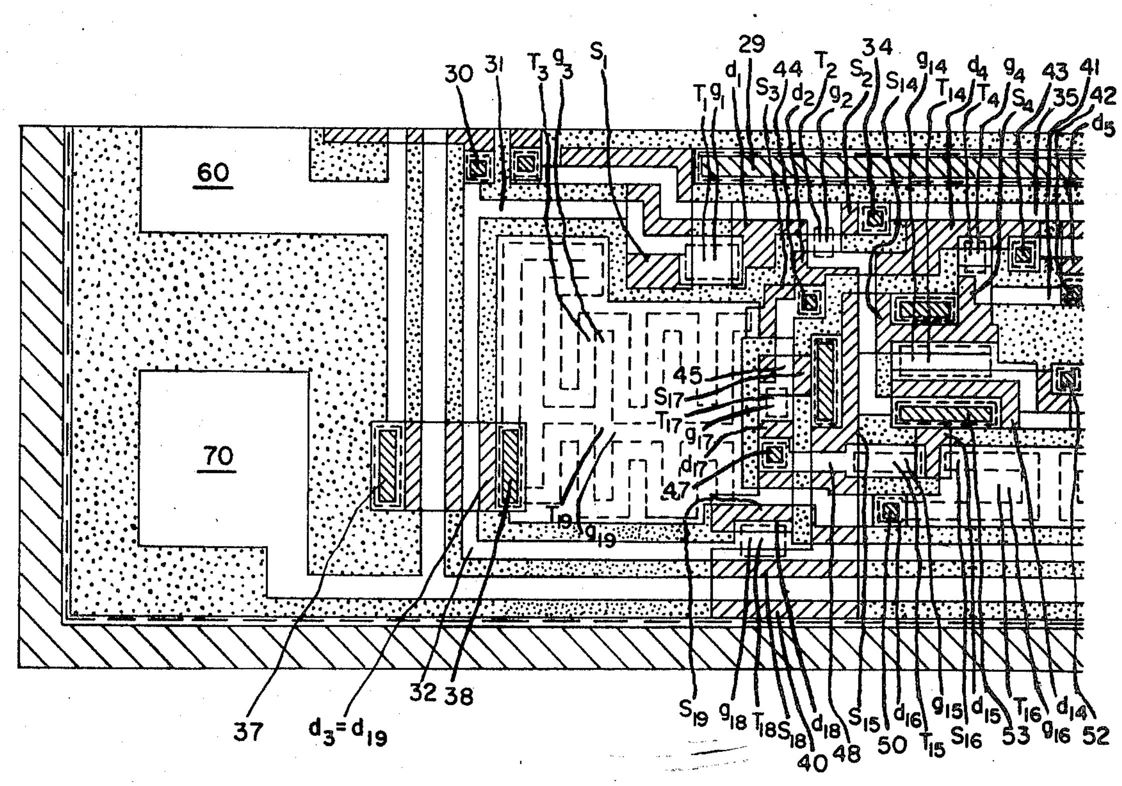
Figure 3B:
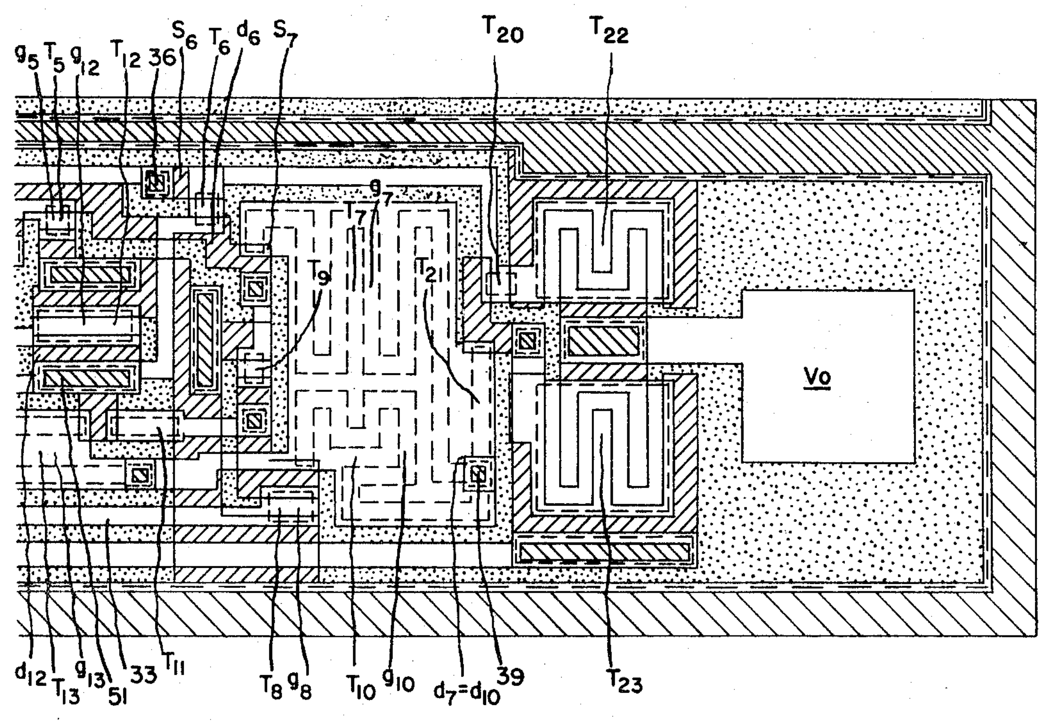
Figure 4:
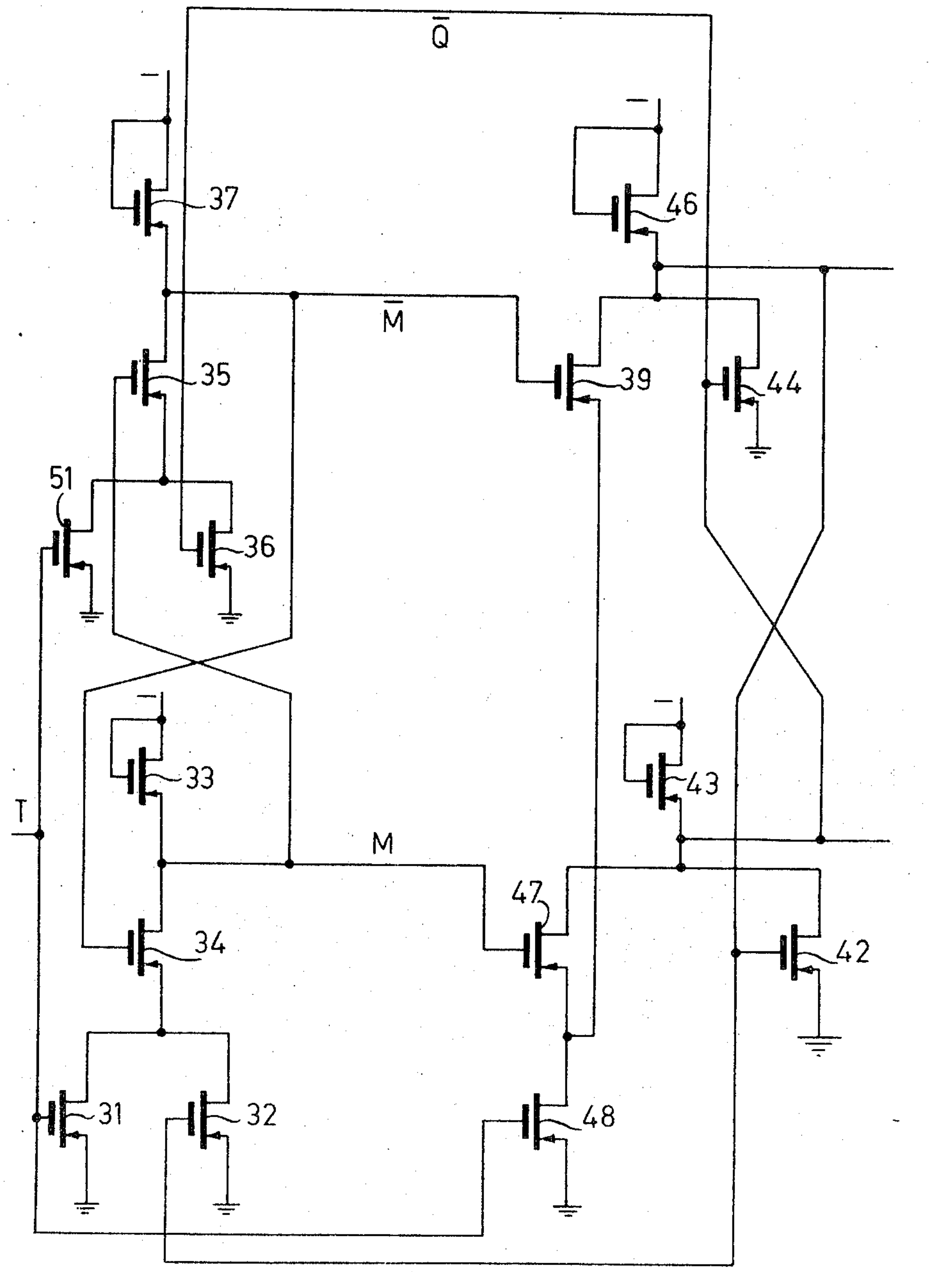

The invention will now be described more fully with reference to the accompanying drawings, in which FIG. 1 is a circuit diagram of a flip-flop according to the invention, FIG. 2 shows voltage waveforms illustrating the operation of the flip-flop of FIG. 1, FIGS. 3*a* and 3*b* show a topology of an integrated circuit for realizing the flip-flop of FIG. 1, and FIG. 4 shows a modification of the circuit diagram of FIG. 1.

FIG. 1 shows a flip-flop which is equipped with isolated gate field-effect transistors and comprises a master flip-flop 4, 5 and a slave flip-flop 12, 14. The flip-flops are of the usual type in which the drain of one transistor is connected to the gate of the other and vice versa. The load resistors for the transistors of these flip-flops take the form of isolated-gate field-effect transistors 3, 7 and 13 and 16 the gates of which are connected to their drains and which are connected as resistors. If desired, there may be applied to the gates a fixed voltage other than — for example more negative than — that which is applied to the drains, which are connected to a supply terminal 60. Also, for saving space on the semiconductor crystal several such field-effect transistors serving as resistors may be connected in series, especially in those cases in which a high value of the quotient of the length-width ratio of the channel of such a resistance transistor divided by that of the associated switching transistor is desired. Alternatively, diffusion regions of a semiconductor single crystal connected as resistances may be used.

The master flip-flop 4, 5 is connected to a first gate circuit comprising the isolated-gate field-effect transistors 1, 2 and 6, clock signals T being applied to the transistor 1, and the output signal of the terminal Q and the inverse output signal of the terminal $\overline{Q}$ of the slave flip-flop being applied to the transistors 2 and 6, respectively. The slave flip-flop 12, 14 is connected to a second gate circuit comprising isolated-gate field-effect transistors 8, 9, 11, 15, 17 and 18, the clock signals T, which are applied to the transistor 1, being also applied to the transistors 8 and 18, while the outputs of the master flip-flop, more specifically the drains of the transistors 2 and 6, are connected to the inputs of the said second gate circuit, more specifically to the gates of the transistors 17 and 9, respectively. The isolated-gate field-effect transistors 10, 19 and 21, which are again connected as resistors, and a follower amplifier comprising isolated-gate field-effect transistors 20, 22 and 23 may be integrated together with all the remaining transistors shown in a single semiconductor body. When the circuit arrangement is used as a frequency divider for the clock signals T the output Q may, for example, be applied to a succeeding frequency division stage of similar configuration and an output $V_0$ may be applied to a device which indicates the state of the flip-flop.

The flip-flop operates as follows:

It is assumed that field-effect transistors having p-type channels are used and that a terminal 0 (in FIG. 3 the substrate) is connected to ground, and the terminal 60 is connected to the negative supply voltage. (In this case a lower negative supply voltage is applied to the terminal 70. If field-effect transistors having n-type channels are used, the polarities of the supply voltage and of the clock signals must be reversed). Initially, for example, a negative voltage will appear at the terminal Q and zero voltage at the terminal $\overline{Q}$, see FIG. 2. The transistor 2 then is conductive but the transistor 6 is non-conductive. At the instant at which the clock signal T changes from zero level to negative the transistors 1, 8 and 18 become conductive. Thus, the fact that the circuit 1, 2 becomes conductive will result in that the voltage M at the drain of the transistor 4 becomes zero, so that the transistor 5 becomes non-conductive, and consequently the transistor 4 will become conductive, which means that the flip-flop 4, 5 changes state. Therefore the first gate circuit 1, 2, 3, 6, and 7 triggers the master flip-flop in response to the concurrence of a negative output from the Q terminal of the slave flip-flop and the negative portion of the clock signal. This state of the master and slave flip-flops is maintained until the clock signal T returns to the zero level. The transistors 1, 8 and 18 then become non-conductive again, and by the change of state of the flip-flop 4, 5 the transistor 9 has become conductive, but the transistor 17 has become non-conductive, so that, since now both transistors 17 and 18 have become non-conductive, the transistor 15 becomes conductive, with the result that the voltage at the gate of the transistor 12 returns to zero level and hence the slave flip-flop 12, 14 changes state. The second gate circuit 8, 9, 11, 15, 17, and 18 in this embodiment therefore triggers the slave flip-flop in response to the concurrence of a zero voltage output from the M terminal of the master flip-flop and the zero voltage level portion of the clock signal.

As will be seen from FIG. 2, this results in frequency division of the clock signal T, and the state M of the master flip-flop is followed by the slave flip-flop with a time delay determined by the duration of a clock pulse T. (Instead of the clock pulse T shown in FIG. 2, a different, for example, a sinusoidal, clock signal may be used, in which case the duration is the time interval between the instants at which the clock signal T has reached a sufficient value to open and to close the gate transistors 1, 8 and 18 to an extent such that one of the two flip-flops changes state).

We are concerned with inverse logic, because only in the negative condition of the clock signal T and of the output signal Q of the slave flip-flop the partial gate 1, 2 opens, whereas during the zero condition of the clock signal T and the output signal M of the master flip-flop the partial gate 17, 18 becomes non-conductive, so that the slave flip-flop changes state. Consequently, at one level (the negative level) of the clock signal T one of the partial gates of the first-mentioned gate circuit 1, 2, 6 is opened, whereas the second gate circuit 9, 8, 11, 15, 18, 17 remains closed. In contradistinction thereto, at the other level (the zero level) of the clock signal T the first gate circuit 1, 2, 6 is in the closed condition, whereas one of the partial gates of the second gate circuit 9, 8, 11, 15, 18, 17 is open. This method of switching involves a smaller number of circuit elements than if the gates were operated with the same logic, the number of gates required is reduced, the dissipation is reduced and the required connections between the various circuit elements can be shorter, as will be seen from FIG. 3. Further, an important advantage is that the output of one transistor of the master flip-flop (for example the drains of the transistors 2 and 4) is connected through the second gate circuit (specifically the transistors 17, 18 and 15) to that transistor (14) of the slave flip-flop the output of which (the drains of the transistors 14 and 15) is connected to this transistor (4) of the master flip-flop through the first gate circuit (specifically the transistor 2). As will be seen from FIG. 3, this results in avoiding crossing connections which provide difficulty in the manufacture of integrated circuits. However, the said advantages are obtained both with field-effect transistors which may or may not have isolated gates and with transistors of the bipolar type (junction transistors).

FIG. 3 shows on an enlarged scale a top plan view of a semiconductor single crystal in which the flip-flop shown in FIG. 1 has been realized as an integrated circuit. The parts which are grey in the drawing picture those parts of the crystal substrate of the one conductivity type, for example of the n-type, which extend to the surface. The black parts are the areas where a shallow diffusion has taken place so that in these areas regions of the opposite conductivity type (p-type) have been formed. In so far as these regions have been covered by other layers they are hidden. After this diffusion step the crystal is exposed to an atmosphere such that it is coated with an insulating layer, for example an oxide or a nitride. At the areas at which the channels of the field-effect transistors are to be formed, this coating either is removed by etching to the correct (small) thickness or it is entirely removed, and subsequently a considerably thinner insulating coating is applied. The entire assembly is surrounded by a scoring track for breaking up the crystal, which track is shown by the coarse shading. Openings in which the insulating layer has been removed for the application of metal contacts are shown by fine shading. Finally, a metal contact layer is applied, which in FIG. 3 has been left white.

The resulting field-effect transistors are designated by $T_1$ to $T_{23}$, the subscripts corresponding to the transistors of FIG. 1. The clock signals come in by way of a contact which falls outside the FIG. at the opening 30 and are applied through conductors 31, 32 and 33 to gates $g_1$, $g_{18}$ and $g_8$ of the transistors $T_1$, $T_{18}$ and $T_8$. The source $S_1$ of the transistor $T_1$ is connected to the substrate at an opening 29, its drain $d_1$ at the same time forms the source $S_2$ of the transistor $T_2$, while through an opening 34 a conductor 35 and an opening 36 a connection is established to the source $s_6$ of the transistor $T_6$. The drain $d_6$ of the latter transistor at the same time forms the source $s_7$ of the transistor $T_7$, the zig-zag oxide film or other insulating layer of this transistor being shown by broken lines. Similarly, the drain $d_2$ of the transistor $T_2$ at the same time is the source $s_3$ of the transistor $T_3$, the channel of which lies below the zig-zag oxide film or other insulating layer which is shown by broken lines and terminates at the drain $d_3$, which also forms the drain $d_{19}$ of the transistor $T_{19}$. A contact 60 for the supply voltage is connected through openings 37 and 38 to this drain $d_3$ and also to the gates $g_3$ and $g_{19}$ of the transistors $T_3$ and $T_{19}$ which cover the two zig-zag broken-line oxide films of the transistors $T_3$ and $T_{19}$. Through these gates $g_3$ and $g_{19}$ and through the gates $g_{16}$, $g_{13}$, $g_7$ and $g_{10}$ of the transistors $T_{16}$, $T_{13}$, $T_7$ and $T_{10}$ the contact 60 is also connected to an opening 39 in which a contact is established to the common drains $d_7$ and $d_{10}$ of the transistors $T_7$ and $T_{10}$, the zig-zag broken-line oxide films of which are covered by the interconnected gates $g_7$ and $g_{10}$. The drain $d_2$ also forms one diffusion region together with the drain $d_4$ of the transistor $T_4$, the source $s_4$ forms a diffusion region which extends over the sources $s_{14}$, $s_{15}$, $s_{17}$ and $s_{18}$ of the transistors $T_{14}$, $T_{15}$, $T_{17}$ and $T_{18}$ and which makes an interconnection to the substrate to an area 40. The gate $g_4$ of the transistor $T_4$ is connected through a conductor 41 to an opening 42, at which a connection is established to the drain $d_5$ of the transistor $T_5$. Similarly, the gate $g_5$ of the transistor $T_5$, is connected through an opening 43 to the drain $d_4$ of the transistor $T_4$. The diffusion region which forms the drain $d_2$ of the transistor $T_2$ and also the source $s_3$ of the transistor $T_3$ is connected through an opening 44 and a conductor 45 to the gate $g_{17}$ of the transistor $T_{17}$. The drain $d_{17}$ of the transistor $T_{17}$ is connected through an opening 47 and a conductor 48 to the gate $g_{15}$ of the transistor $T_{15}$, and this drain also forms a single diffusion region together with the drain $d_{18}$ of the transistor $T_{18}$ and the source $s_{19}$ of the transistor $T_{19}$. The drains of the transistors $T_{14}$ and $T_{15}$ ($d_{14}$ and $d_{15}$ respectively) together with the source $s_{16}$ of the transistor $T_{16}$ form a single diffusion region, the drain $d_{16}$ of the transistor $T_{16}$ being connected to its gate $g_{16}$ through an opening 50. The connection of the gate $g_{14}$ of the transistor $T_{14}$ to the drain $d_{12}$ of the transistor $T_{12}$ is established through an opening 51, the connection of the gate $g_{12}$ of the latter transistor to the drain $d_{14}$ of the transistor $T_{14}$ is established through an opening 52, and the connection of this drain $d_{14}$ to the gate $g_2$ of the transistor $T_2$ is established through an opening 53. As will be seen from the drawing, the remaining transistors have been symmetrically arranged, the sources, gates and drains being correspondingly disposed, avoiding additional crossing connections such as would be necessary if the master and slave flip-flops were operated with the same logic.

FIG. 3 also shows that the length width ratio of the channels for the switching transistors used in the first gate circuit $T_1$, $T_2$, $T_6$ connected to the master flip-flop and the length width ratios of the associated transistors $T_3$ and $T_7$ connected as resistors have been made entirely different from that for the second gate circuit $T_9$, $T_8$, $T_{11}$, $T_{15}$, $T_{18}$, $T_{19}$ connected to the slave flip-flop. The switching transistor $T_1$ of the first gate circuit has a length width ratio of about 1.2; for the associated (resistance) transistors $T_3$ and $T_7$ this ratio is about 60. In contrast therewith, the length width ratios of the channels of the switching transistors $T_8$ and $T_{18}$ of the second gate circuit are about 0.4 and those of the associated resistance transistors $T_{10}$ and $T_{19}$ are about 40. The quotient of the two length width ratios in the first case is about 50 (neglecting the influence of the transistors 2 and 6 which are connected in series with the transistor 1 and effectively reduce this number) and for the second case it is about 100 (neglecting the influence of the stages 11, 13 and 15, 16 which are connected in cascade with the stages 8, 10 and 18, 19, and effectively increase this number). If desired, there may be provided in series with the transistors 10 and 19 (FIG. 1) additional small transistors 24, 25 in which the width and length of the channels are substantially equal and the gates and drains of which have been interconnected and which ensure that a substantially constant voltage drop is produced across them. This also contributes to the prevention of the untimely change of state of the flip-flops, which phenomenon will be described hereinafter. In the usual master slave flip-flops in the form of integrated circuits, the two flip-flops are identical, i.e. the length width ratios of the channels for the two gate circuits and the two flip-flops, and also the values of the associated resistors have been made equal. By the steps described, the operation is rendered considerably more reliable, as will appear from the following discussion:

As has been stated hereinbefore, starting from a condition in which the signal Q has a negative level and the clock signal T changes from zero to a negative level, the master flip-flop will tend to change state from negative to zero level. Therefore, at this instant the transistor 17 is rendered non-conductive and simultaneously the transistor 18 is rendered conductive. However, since the edge steepness of the clock pulses is not infinite, since the possibility of controlling by means of sinusoidal clock signals is also desirable and since in other respects also slow-response phenomena due to stray capacitances and the like must be taken into account, the instant at which the transistor 18 becomes conductive need not exactly coincide with the instant at which the transistor 17 becomes non-conductive, but for a short time a negative voltage may be produced at the drains of the transistors 17 and 18. Generally the fact is counted upon that this voltage is so small and in addition becomes effective so slowly by the capacitances present that it cannot open the transistor 15; for opening of the transistor 15 would result in an untimely change of state of the slave flip-flop. By the steps described it is ensured, however, that there will be an almost complete independency on parasitic phenomena so that even in the case or a low edge steepness of the clock signal a reliable change of state of the master flip-flop and no change of state of the slave flip-flop are produced at the above-mentioned instant. This can be explained as follows:

At higher length width ratios of the channels of the switching transistors a given value of the current passed will only be reached at a higher voltage at the gates. The greater are the length width ratios of the channels of the resistance transistors, the smaller will be the current flowing through these resistance transistors at a given voltage. In the example given, the gate voltage required to render the transistor 1 conductive in a degree such that the master flip-flop changes state will be higher than the voltage required to cause the transistor 18 to pass a current sufficient to maintain the transistor 15 cut off. Thus, an untimely change of state is avoided. For similar reasons, an untimely change of state of the master flip-flop is prevented at the instant at which the clock signal returns from negative to zero level and hence the slave flip-flop changes state; in this case, the transistor 1 is cut off before the transistor 15 (or 11) respectively is rendered conductive.

Many modifications may be made in the circuit arrangement shown in the FIG. 1. For example, both the master flip-flop and the slave flip-flop may be provided with gate circuits of a different design while they may still be operated with "inverse logic," i.e. one of the partial gate circuits (1,2) connected to one flip-flop (4,5) will open only in the case of one (negative) condition of the signals (T and Q) applied to this partial gate circuit, whereas one of the partial gate circuits (17, 18, 15) connected to the other flip-flop (12, 14) will only open in the case of the other (zero) condition of the signals T and M) applied to this partial gate circuit. For this purpose, the two partial gate circuits (1, 2 and 1,6 respectively) of one gate circuit (1, 2, 6) each comprise two transistors (1, 2 and 1, 6 respectively) having their main current paths connected in series, the clock signal T being applied to one transistor (1) and the output signal (Q or $\overline{Q}$) of the flip-flop (12, 14) not associated with this gate circuit being applied to the other transistor (2 or 6 respectively); in contradistinction thereto, the two partial gate circuits (17, 18, 15 and 9, 8, 11) of the other flip-flop (12, 14) each comprise two transistors (18, 19 and 8, 9, respectively) having their main current paths connected in parallel, the clock signal T being applied to one transistor (18 or 8) and the output signal (M or $\overline{M}$) of the flip-flop (4,5) being applied to the other transistor (17 or 9 respectively). The gate circuits 1, 2, 6 and 9, 8, 11, 15, 18, 17, operate in a manner such that always only one of the two partial gate circuits (either 1, 2 or 1, 6 and either 8, 11 or 15, 18, 17, respectively) changes state whereas the other partial gate does not show any change of the associated flip-flop.

FIG. 4 shows a circuit diagram which is a modification of the circuit diagram of FIG. 1, the master flip-flop comprising transistors 35 and 34 together with transistors 33 and 37 connected as resistances and the slave slip-flop comprising transistors 42 and 44 together with transistors 43 and 46 connected as resistances. As will be seen from the Figure, the clock signals T are applied to transistors 31, 51 and 48, the output signals M and $\overline{M}$ of the master flip-flop are applied to transistors 47 and 39, respectively and the output signals Q and $\overline{Q}$ of the slave flip-flop are applied to transistors 32 and 36 respectively, while the gate circuit connected to one flip-flop (34, 35) comprises partial gate circuits (31, 32 and 51, 36 respectively) which each comprise two transistors having their main current paths connected in parallel, the clock signal T being applied to one of these transistors (31 or 51 respectively) and the output signals Q and $\overline{Q}$ of the non-associated flip-flop (42, 44) being applied to the other transistor (32 or 36), respectively) while the gate circuit connected to this non-associated flip-flop (42, 44) comprises partial gate circuits (48, 47 and 48, 39) which each comprise two transistors which have their main current paths connected in series and to one (48) of which the clock signal T is applied, while to the other of these series connected transistors (47 or 39) the output signals (M or $\overline{M}$ respectively) of the non-associated one flip-flop (33, 35) are applied. The quotients of the length width ratios of the channels of the resistance transistors 33 and 37, respectively divided by the corresponding ratios of the associated switching transistors 31 and 51, respectively, has been made higher than the quotients of the length width ratios of the channels of the resistance transistors 43 and 46, respectively, divided by that of the switching transistor 48. This ensures reliable operation and furthermore the resistance transistors 43 and 46 of the slave flip-flop 42, 44 may have comparatively low resistance values, so that at the output a comparatively large current becomes available for controlling further stages. In addition, the number of resistance transistors has been considerably reduced, which leads to a dissipation smaller than in the circuit arrangement of FIG. 1.

Hereinbefore, the flip-flop 4, 5 has always been referred to as the master flip-flop and the flip-flop 12, 4 has always been termed the slave flip-flop. Obviously, these are only names which might have been interchanged. Furthermore, it is immaterial from which of the two flip-flops the output Q is taken. The measure described in respect of the length width ratios of the various channels can with the same effect be used in JK and DV flip-flops which also comprise a master flip-flop and a slave flip-flop and in which for similar reasons an untimely change of state of one flip-flop at the instant at which the other flip-flop changes state is to be avoided. The input gates of the master flip-flop then will be slightly more complicated, because they are to be controlled not only by the outputs Q and $\overline{Q}$ of the slave flip-flop and by the clock signals, but also by the J and the K signal respectively (or the D and the V signal respectively). The only essential feature is that the quotient of the length-width ratio of transistor 3 (or 7 or 43 or 46 respectively) divided by the length width ratio of the channel of the transistor 1 (or 48 respectively) is smaller than the quotient of the resistor 19 (or 10 or 33 or 37 respectively) divided by the length width ratio of the channel of the transistor 18 (or 8 or 31 or 51 respectively), the transistors 1, 2 (or 1, 6 or 48, 47 or 48, 39 respectively) controlled by the clock signal T and by the output signal of the one flip-flop having their main current paths connected in series, while the transistors 18, 17 (or 8, 9 or 31, 32 or 51, 36 respectively) controlled by the clock signal T and by the output signal of the other flip-flop have their main current paths connected in parallel.

What is claimed is:

1. A master-slave flip-flop, comprising a master flip-flop triggerable to two stable states; a slave flip-flop triggerable to two stable states; a first gate circuit means for triggering the master flip-flop to a state corresponding to the state of the slave flipeflop in response to a first voltage level of a clock signal and comprising a first transistor having a control input for receiving the clock signal and a main current path, a second transistor having a control input connected to a first output of the slave flip-flop and a main current path connected on one side to a first input of the master flip-flop and on the other side through the main current path of the first transistor to a source of constant potential, a third transistor having a control input connected to a second output of the slave flip-flop and a main current path connected on one side to a second input of the master flip-flop and on the other side through the main current path of the first transistor to the source of constant potential; and a second gate circuit means for triggering the slave flip-flop into a state corresponding to the state of the master flip-flop in response to a second voltage level of the clock signal and comprising a fourth transistor having a control input connected to the clock signal and a main current path connected on one side to the source of constant potential, a fifth transistor having a control input connected to a first output of the master flip-flop and a main current path connected in parallel with the main current path of the fourth transistor, first coupling means for connecting the main current paths of the fourth and fifth transistors to a first input of the slave flip-flop, a sixth transistor having a control input connected to the clock signal and having a main current path connected to the source of constant potential, a seventh transistor having a control input connected to a second output of the master flip-flop and having a main current path connected in parallel with the main current path of the sixth transistor, and second coupling means for connecting the main current paths of the sixth and seventh transistors to a second input of the slave flip-flop.

2. A circuit as claimed in claim 1, wherein the master flip-flop comprises an eighth transistor having a control input connected to the main current path of the second transistor and having a main current path connected to the source of constant potential, and a ninth transistor cross coupled with the eighth transistor and having a control input connected to the main current path of the third transistor and having a main current path connected to the source of constant potential; and wherein the slave flip-flop comprises a tenth transistor having a control input connected to the control input of the second transistor and having a main current path connected to the first coupling means and an eleventh transistor cross coupled with the tenth transistor and having a control input connected to the control input of the third transistor and having a main current path connected to the second coupling means.

3. A circuit as claimed in claim 2, wherein the first transistor of the first gate circuit and the fourth and sixth transistors of the second gate circuits are isolated-gate field-effect transistors, further comprising a separate corresponding resistance element connecting the main current path of each of the isolated-gate field-effect transistors to a second source of constant potential, wherein the quotient of the length-width ratio of the channel of the first transistor divided by the resistance of the corresponding resistance element is larger than the quotient of the length-width ratio of the channel of either the fourth transistor and the resistance of the corresponding resistance element or the sixth transistor and the resistance of the corresponding resistance element.

4. A circuit as claimed in claim 1, further comprising two sets of isolated-gate field-effect transistors, each set comprising at least two isolated-gate field-effect transistors and each isolated-gate field-effect transistor having a shunt connected between the gate and drain terminals thereof, means for connecting the channels of each set of field-effect transistors in a separate series circuit, means for connecting the main current paths of the parallel connected fourth and fifth transistors to a second source of constant potential through one of the series circuits, and means for connecting the main current paths of the parallel connected sixth and seventh transistors to the second source of constant potential through the other series circuit.

5. A circuit as claimed in claim 1, wherein the main conduction path of the second transistor is connected to the control input thereof through the control input and the main conduction path of the fifth transistor and the first coupling means, and wherein the main conduction path of the third transistor is connected to the control input thereof through the control input and the main conduction path of the seventh transistor and the second coupling means.

6. A circuit as claimed in claim 1, wherein all the elements comprise isolated-gate field-effect transistors integrated on a single semi-conductor substrate.

7. A circuit as claimed in claim 1, wherein the slave flip-flop comprises two transistors, each transistor of the slave flip-flop having a control input and a main conduction path, wherein the current to the main conduction path of each transistor of the slave flip-flop varies as a function of the difference between signals applied to the control input and one end of the main conduction path of each slave flip-flop transistor, said one end of each transistor of the slave flip-flop is connected to a separate output of the second gate circuit means for triggering the slave flip-flop.

* * * * *